United States Patent
Wakita et al.

Patent Number: 5,538,585
Date of Patent: Jul. 23, 1996

[54] PROCESS FOR PRODUCING GAS ELECTRODE

[75] Inventors: Shuhei Wakita; Yoshinori Nishiki; Shuji Nakamatsu, all of Kanagawa, Japan

[73] Assignee: Permelec Electrode Ltd., Kanagawa, Japan

[21] Appl. No.: 245,562

[22] Filed: May 18, 1994

[30] Foreign Application Priority Data

May 18, 1993 [JP] Japan .................. 5-139614

[51] Int. Cl.$^6$ .................. B32B 31/20; B05D 5/12
[52] U.S. Cl. .................. 156/308.2; 156/309.3; 427/77; 427/113; 427/115; 427/125; 427/229; 427/380; 502/101; 502/325; 502/159
[58] Field of Search .................. 427/58, 195, 201, 427/125, 383.1, 380, 376.1, 115, 229, 379, 77, 113; 156/62.2, 60, 309.3, 308.2; 502/101, 152, 156, 159, 171, 172, 173, 325

[56] References Cited

U.S. PATENT DOCUMENTS

| | | | |
|---|---|---|---|
| 3,598,657 | 8/1971 | Barber | 427/115 |
| 4,166,143 | 8/1979 | Petrow | 427/115 |
| 4,175,055 | 11/1979 | Goller | 427/201 |
| 4,263,376 | 4/1981 | Blurton | 427/115 |
| 4,313,972 | 2/1982 | Goller | 427/115 |
| 4,602,426 | 7/1986 | Kampe | 427/115 |
| 4,830,880 | 5/1989 | Okubi et al. | 427/229 |
| 5,137,754 | 8/1992 | Watanabe | 427/115 |
| 5,234,777 | 8/1993 | Wilson | 427/115 |
| 5,240,893 | 8/1993 | Witherspoon | 427/115 |
| 5,281,635 | 1/1994 | Bishop | 427/229 |
| 5,314,760 | 5/1994 | Tsou | 427/115 |

*Primary Examiner*—Janyce Bell
*Attorney, Agent, or Firm*—Sughrue, Mion, Zinn, Macpeak & Seas

[57] ABSTRACT

A process for producing a gas electrode is disclosed, comprising sintering a mixture of carbon powder and a fluorine resin powder to form a sheet as a gas electrode base, coating one side of the sheet base with an organic solution prepared by dissolving a platinum group metal salt in an organic solvent capable of forming an organic complex with the metal salt, drying the coating layer, and calcining the coating layer at a temperature of from 250° to 380° C. in an inert atmosphere to reduce the platinum group metal oxide thereby forming a catalyst layer on the sheet base. Reduction (calcination) of the platinum group metal salt can be effected without using dangerous hydrogen gas and without being accompanied by decomposition of the fluorine resin and provides a uniform catalyst layer comprising fine platinum particles having a large surface area with a minimized thickness.

4 Claims, No Drawings

PROCESS FOR PRODUCING GAS ELECTRODE

FIELD OF THE INVENTION

This invention relates to a gas electrode useful as a fuel cell or an electrode for industrial electrolysis for production of ozone, etc.

BACKGROUND OF THE INVENTION

A gas electrode is an electrochemical electrode for conducting oxidation or reduction of a gaseous component. It has been developed especially for use as a fuel cell. Electrolytes to be used in a gas electrode include phosphoric acid, a molten salt, and a solid electrolyte. In recent years, fuel cells using a solid polymer electrolyte (ion-exchange membrane) has been attracting attention for their low working temperatures. In the field of industrial electrolysis, too, a solid polymer electrolyte is known to be useful in electrolysis of water or electrolytic production of ozone. A gas electrode can be used as such as an electrolytic electrode for gas evolution, or it can also serve as an hydrogen pump or an oxygen pump. It can also serve as an oxygen gas electrode as a negative pole for electrolytically producing ozone without being accompanied by hydrogen evolution.

A gas electrode is generally comprised of a conductive porous material, and it is important to optimize the state of the interfaces of the three phases consisting of a gaseous phase, a liquid phase, and a solid phase. A gas electrode is generally produced by mixing conductive carbon fine powder and a hydrophobic fluorine resin powder or a suspension thereof, forming the mixture into a sheet, and sintering the sheet. An electrode catalyst may previously be added to carbon powder in a wet process, as disclosed in JP-A-57-152479 (the term "JP-A" as used herein means an "unexamined published Japanese patent application"), or a catalyst solution may be applied to a sheet gas electrode and then sintered (see JP-A-62-156268). The former process has conventionally been used for the advantage that a homogeneous and fine platinum group metal catalyst can be supported. However, the process has a considerably low productivity when carried out on an industrial scale because the bath is difficult to control, and the yield is low. The latter process is economically advantageous because of satisfactory yield. However, it is difficult to control the catalyst particle size. Additionally, the process involves a practical problem since a dangerous material, such as hydrogen gas, is used in calcination.

SUMMARY OF THE INVENTION

An object of the present invention is to provide a process for producing a gas electrode economically and safely.

Another object of the present invention is to provide a process for producing a gas electrode which exhibits excellent characteristics when used in electrolysis or assembled into a fuel cell, preferably in combination with a solid polymer electrolyte.

The present invention relates to a process for producing a gas electrode comprising sintering a mixture of carbon powder and a fluorine resin powder to form a sheet for a gas electrode base, coating one side of the base with an organic solution prepared by dissolving a platinum group metal salt in an organic solvent capable of forming an organic complex with the metal salt, drying the coating layer, and pyrolyzing the coating layer at a temperature of from 250° to 380° C. in an inert atmosphere to reduce the platinum group metal salt thereby forming a catalyst layer.

The above-mentioned organic solvent preferably includes allyl alcohol and butyl alcohol. The sheet gas electrode base may be prepared by applying a mixture of carbon powder and a fluorine resin powder on a sheet made of carbon fiber or a porous metallic material, followed by sintering.

DETAILED DESCRIPTION OF THE INVENTION

As a result of extensive investigations, the present inventors have found that gas electrodes, especially those which can suitably be used in an electrochemical apparatus using a solid polymer electrolyte, are required to possess the following characteristics. (1) Because of using a solid phase electrolyte, it is a necessary and adequate condition that a catalyst should be provided selectively on the part where the gas electrode is in contact with the solid polymer electrolyte. Even where a solid polymer electrolyte is not used, a catalyst selectively provided on the part where the gas electrode is in contact with an electrolyte is sufficient since there are many cases in which a reaction gas penetrates through a porous electrode base, reaches one side of the base, and contacts the electrolyte on that side. (2) Since a liquid phase electrolyte is not used, a gas electrode does not need to have a hydrophilic part. It is preferred that a gas electrode should solely consist of a hydrophobic layer in order to accelerate supply or discharge of a reaction gas and that a catalyst should be formed on the hydrophobic layer in the form of a layer as thin as possible. Where a solid polymer electrolyte is not used, the catalyst supported is apt to release. Even in such a case, a catalyst layer should be formed on an electrode base on the side to be in contact with an electrolyte. (3) Platinum group metal particles which constitute the catalyst layer should have a particle size of not more than 10 nm, and preferably from 1 to 5 nm.

When the aforesaid process comprising reducing a platinum group metal salt by pyrolyzation to deposit a platinum group metal catalyst on a gas electrode base is followed, as the pyrolyzing temperature increases, the catalyst particles produced tend to agglomerate to form particles having an increased particle size and therefore a reduced surface area, failing to exhibit desired catalyst activity. Therefore, the pyrolyzation for reduction of the platinum group metal salt must be conducted at as low a temperature as possible. In the process according to the present invention, a platinum group metal catalyst is prepared by dissolving a platinum group metal salt in an organic solvent capable of forming an organic complex with the metal salt, applying the solution on a gas electrode base, and pyrolyzing the coating layer. According to this process, pyrolyzation of a platinum group metal salt, i.e., deposition of platinum group metal particles on the surface of a gas electrode base, can be carried out at temperatures lower than those conventionally adopted. Agglomeration of precipitated particles can thus be prevented, making it feasible to provide a gas electrode having supported thereon fine catalyst particles. Pyrolyzation at a low temperature is effective not only to make the catalyst particles smaller, but to inhibit decomposition of a fluorine resin, which is often used in a gas electrode, thereby ensuring the structural strength of a gas electrode and preventing impurities from entering.

The gas electrode base which is used in the present invention can be prepared either by sintering a mixture or suspension of carbon powder and a fluorine resin powder into a sheet or by applying carbon powder and a fluorine resin powder on both sides of a sheet made of carbon fiber or a porous metallic material, followed by sintering. The amount ratio by volume of the carbon powder and the fluorine resin powder is preferably from 1:1 to 1:5.

The carbon powder which can be used in the present invention include furnace black, graphitized furnace black, and glassy carbon powder. The carbon powder preferably has a particle diameter of not more than 0.1 μm. The fluorine resin to be used preferably includes hydrophobic high polymers, such as polytetrafluoroethylene, preferably in the form of a dispersion.

The gas electrode base can be prepared by kneading carbon powder and a fluorine resin powder at a prescribed ratio in an appropriate solvent, such as naphtha, to prepare a paste. The paste is shaped into a sheet by means of a roller or a press or spread on both sides of a sheet made of carbon fiber or a porous metallic material, and dried. The sheet is then sintered at a temperature not higher than the decomposition temperature of the fluorine resin.

On the resulting gas electrode base is provided a catalyst layer comprising fine particles of a platinum group metal. The kind of platinum group metal salt is selected according to the desired catalyst particles. For example, one or more of chloroplatinic acid, ruthenium chloride, and silver nitrate may be used. The platinum group metal salt(s) is/are dissolved in one or more organic solvents capable of forming an organic complex with the metal salt, such as allyl alcohol and butyl alcohol, with allyl alcohol being preferred.

An adequate amount of the resultant metal salt solution is applied to the gas electrode base on the side to be in contact with a solid polymer electrolyte or a general electrolyte, and calcined. The solution may be applied once or several times. The total coated amount of the platinum group metal salt solution is preferably from 1 to 100 g/m$^2$ in terms of platinum group metal.

According to this process using an organic solvent capable of forming a complex with a platinum group metal salt, reduction of the metal salt by pyrolyzation can be carried out at a temperature below the decomposition temperature of a fluorine resin, i.e., not higher than 380° C. Accordingly, incorporation of impurities which may arise during decomposition of a fluorine resin can be prevented. The lower limit of the calcining temperature is 250° C. If the pyrolyzation is conducted at temperatures less than 250° C., the platinum group metal salt will not be reduced sufficiently, and desired electrode performance will not be obtained.

Catalyst particles produced under the above-mentioned pyrolyzation conditions have a particle size of not more than 10 nm. The catalyst particle size may further be reduced to 1 to 5 nm by shortening the pyrolyzation time.

If the pyrolyzing temperature exceeds 380° C., the catalyst particles undergo agglomeration into large particles, which do not exhibit sufficient catalytic performance. While decomposition of the fluorine resin does not occur within the temperature range of from 250° to 380° C., the carbon material, such as carbon powder, may be consumed by oxidation under excess oxygen partial pressure. To avoid this, it is recommended to use an inert gas, such as nitrogen or argon, so as to control the oxygen partial pressure at 0.1 atm or lower.

In accordance with the process of the present invention, a uniform, thin catalyst layer can be formed on a gas electrode base at a temperature below the decomposition temperature of a fluorine resin without using dangerous hydrogen gas, thereby providing a gas electrode exhibiting high performance and containing no impurities. Additionally, the requisite amount of a platinum metal salt can be minimized.

The present invention will now be illustrated in greater detail with reference to Examples, but the present invention should not be construed as being limited thereto.

EXAMPLE 1

A paste prepared from carbon powder ("Vulcan XC-72" produced by Cabot G. L. Inc.), an aqueous suspension of a tetrafluorocarbon resin ("30J" produced by Du Pont-Mitsui Fluorochemicals Co., Ltd.), and solvent naphtha (produced by Wako Pure Chemical Industries, Ltd.) was applied on both sides of a sheet made of carbon fiber ("P-20" produced by Nippon Carbon Co., Ltd.) and sintered in air at 350° C. to prepare a gas electrode base. A solution of 4.2 g of chloroplatinic acid in 10 ml of allyl alcohol was applied to one side of the electrode base with a brush to a coating weight of 1.5 g-platinum/m$^2$, dried at 70° C., and pyrolyzed in an argon stream at 350° C. for 5 minutes. The steps of coating and pyrolyzation were repeated three times to obtain a gas electrode. The platinum particles on the gas electrode had an average particle size of 4 nm under a transmission electron microscope (hereinafter abbreviated as TEM).

The electrode was brought into contact with an ion-exchange membrane ("Nafion 117", a perfluorosulfonate ionomer, produced by E. I. Du Pont de Nemours & Co., Inc.) which had been coated, on one side thereof, with Nafion liquid (a solubilized perfluorosulfonate ionomer produced by Aldrich Co.), with the catalyst side of the electrode and the coated side of the ion-exchange membrane facing to each other, and they were bonded by hot pressing at 130° C. and 30 kg/cm$^2$ for 5 minutes. An electrolytic cell was assembled by using the resulting gas electrode as a negative pole and a plate made of titanium chatter fiber (produced by Tokyo Rope Mfg. Co., Ltd.) on which lead dioxide had been electrodeposited as a positive pole.

Oxygen gas was fed to the negative pole, ion-exchanged water was fed to the positive pole, and electrolysis was conducted at 30° C. and at a current density of 100 A/dm$^2$. The electrolytic cell voltage was 2.2 V. No hydrogen evolution was observed at the negative pole. The ozone generation efficiency at the positive pole was 15%. The fact that the cell voltage is 3.2 V or higher when hydrogen is evolved at the negative pole demonstrates that the gas electrode of the present invention works extremely effectively.

EXAMPLE 2

A gas electrode base was prepared in the same manner as in Example 1, except for using "PWB-3" (produced by Zoltek Co.) as a carbon fiber sheet. The same chloroplatinic acid solution as used in Example 1 was applied to one side of the electrode base twice with a brush to a coating weight of 4.0 g-platinum/m$^2$, dried at 70° C. for 15 minutes, and pyrolyzed in an argon stream at 350° C. for 5 minutes to obtain a gas electrode. The platinum particles on the gas electrode was found to have an average particle size of 5 nm under a TEM.

The gas electrode was bonded to an ion-exchange membrane in the same manner as in Example 1 and assembled into an electrolytic cell in the same manner as in Example 1. When electrolysis was carried out using the resulting cell under the same conditions as in Example 1, the cell voltage was 2.3 V; no hydrogen evolution was observed at the negative pole; and the ozone generation efficiency at the positive pole was 15%.

EXAMPLE 3

Two gas electrodes were prepared in the same manner as in Example 1. An ion-exchange membrane "Nafion 117" having coated on both sides thereof a Nafion liquid was sandwiched in between the two electrodes with the catalyst layer of each electrode inside. The laminate was bonded by hot pressing at 120° C. and 20 kg/cm² for 5 minutes and inserted into an electrolytic cell. Steam-saturated hydrogen gas at 80° C. was fed to the electrode on one side, and steam-saturated oxygen gas at 80° C. was fed to the electrode on the other side to make the cell function as a fuel cell. As a result, a high output of 0.4 V was obtained at a current density of 100 A/dm² at 80° C.

EXAMPLE 4

A paste prepared from carbon powder "Vulcan XC-72", an aqueous suspension of a tetrafluorocarbon resin "30J", and solvent naphtha (produced by Wako Pure Chemical Industries, Ltd.) was rolled into a sheet and sintered in air at 350° C. to prepare a gas electrode base. A solution of 2.2 g of ruthenium chloride in 10 ml of allyl alcohol was applied to one side of the electrode base with a brush to a coating weight of 2.5 g-ruthenium/m², dried at 70° C. for 15 minutes, and pyrolyzed in an argon stream at 350° C. for 5 minutes. The steps of coating and pyrolyzation were repeated three times to obtain a gas electrode.

The catalyst side of the electrode was brought into contact with an ion-exchange membrane "Nafion 177" to make a negative pole, which was combined with a positive pole made of a plate of titanium chatter fiber on which lead dioxide had been electrodeposited to assemble an electrolytic cell.

Ion-exchanged water was fed to the positive pole, and electrolysis was conducted at 30° C. and at a current density of 100 A/dm². The electrolytic cell voltage was 3.3 V, and the ozone generation efficiency at the positive pole was 15%. This thus illustrates that the gas electrode of the present invention effectively works as an electrode for hydrogen evolution as well.

EXAMPLE 5

A gas electrode base was prepared in the same manner as in Example 1. The same chloroplatinic acid solution as used in Example 1 was applied on the electrode base and pyrolyzed at 250° C. for 10 minutes. The steps of coating and pyrolyzation were repeated three times to prepare a gas electrode. An ozone electrolysis cell was assembled using the resultant gas electrode in the same manner as in Example 1. Oxygen gas and ion-exchanged water were fed to the negative pole and the positive pole, respectively, to conduct electrolysis at 30° C. at a current density of 100 A/dm². The cell voltage was 2.3 V. Hydrogen evolution from the negative pole was not observed.

EXAMPLE 6

A gas electrode base was prepared in the same manner as in Example 1. The same chloroplatinic acid solution as used in Example 1 was applied on the electrode base, and the coated base was sandwiched in between a pair of 0.2 nun thick titanium plates. The laminate was pyrolyzed in air at 380° C. for 5 minutes to obtain a gas electrode. The resulting gas electrode was assembled into an ozone electrolysis cell in the same manner as in Example 1. Oxygen gas and ion-exchanged water were fed to the negative pole and the positive pole, respectively, to conduct electrolysis at 30° C. at a current density of 100 A/dm². The cell voltage was 2.1 V, and no evolution of hydrogen was observed at the negative pole.

COMPARATIVE EXAMPLE 1

A gas electrode was prepared in the same manner as in Example 1, except for changing the pyrolyzing temperature to 400° C. The platinum particles on the resulting gas electrode was found to have an average particle size of 20 nm under a TEM.

An electrolytic cell was assembled using the gas electrode in the same manner as in Example 1, and electrolysis was performed under the same conditions as in Example 1. At a current density of 50 A/dm², hydrogen evolution from the negative pole in an amount corresponding to 10% of the current was observed. The cell voltage exceeded 2.6 V.

COMPARATIVE EXAMPLE 2

A gas electrode was prepared in the same manner as in Example 1, except for replacing allyl alcohol with methanol. The resulting gas electrode was dipped in ion-exchanged water for one day, and the ion-exchanged water was analyzed. As a result, large quantities of platinum and chlorine were detected, and a platinum metal catalyst was not formed.

COMPARATIVE EXAMPLE 3

A gas electrode was prepared in the same manner as in Example 1, except that the pyrolyzation (three times) was conducted at 220° C. for 20 minutes. An ozone electrolysis cell was assembled using the resulting gas electrode in the same manner as in Example 1, and electrolysis was carried out by feeding oxygen gas and ion-exchanged water to the negative pole and the positive pole, respectively. Under conditions of 30° C. and 50 A/dm², the cell voltage was 2.8 V, and evolution of hydrogen corresponding to 10% of the current was observed at the negative pole.

The process for producing a gas electrode according to the present invention is characterized in that the catalyst is formed by forming a sheet gas electrode base by sintering a mixture of carbon powder and a fluorine resin powder, coating one side of the sheet base with an organic solution prepared from a platinum group metal salt and an organic solvent capable of forming an organic complex with the platinum group metal salt, and pyrolyzing the coated layer at a temperature ranging from 250° to 380° C. in an inert atmosphere to reduce the metal salt to platinum particles.

According to the process, calcination, i.e., reduction, of a platinum group metal salt is carried out at a temperature of from 250° C. up to the decomposition temperature of a fluorine resin (380° C.). Within this pyrolyzing temperature range, reduction of the platinum group metal salt can be effected efficiently while preventing incorporation of impurities due to decomposition of a fluorine resin. At the same time, agglomeration of produced catalyst particles, which tends to occur in high-temperature pyrolyzation, can be avoided thereby providing a catalyst layer comprising fine particles having a large surface area and having a uniform and a minimized thickness. Additionally, the catalyst layer is provided only on one side of an electrode base, the side participating in the electrode reaction, so that the requisite amount of the platinum group metal salt can be minimized.

Further, since no dangerous hydrogen gas is used for the reduction of the platinum group metal salt, the process of the present invention is highly safe.

A solid polymer electrolyte, i.e., an ion-exchange membrane, may be bonded to the catalyst layer side of the gas electrode of the present invention. In this embodiment, the catalyst layer is protected by the solid polymer electrolyte and kept away from a liquid phase so that it has prolonged durability.

In another embodiment of the present invention, a gas electrode base may be prepared by coating a substrate made of carbon fiber or a porous metallic material with carbon powder and a fluorine resin powder. In this case, there is obtained a reinforced electrode base.

While the invention has been described in detail and with reference to specific examples thereof, it will be apparent to one skilled in the art that various changes and modifications can be made therein without departing from the spirit and scope thereof.

What is claimed is:

1. A process for producing a gas electrode comprising sintering a mixture of carbon powder and a fluorine resin powder to form a sheet as a gas electrode base, coating one side of the sheet base with an organic solution prepared by dissolving a platinum group metal salt in an organic solvent capable of forming an organic complex with said metal salt, and drying to form a coating layer, and pyrolyzing the coating layer at a temperature of from 250° to 380° C. in an inert atmosphere to reduce said platinum group metal salt thereby forming a catalyst layer substantially free of impurities and without significant agglomeration of particles on said sheet base.

2. The process as claimed in claim 1, wherein said organic solvent is allyl alcohol or butyl alcohol.

3. The process as claimed in claim 1, wherein the process further comprises bonding an ion-exchange membrane to said catalyst layer to obtain a solid polymer electrolyte gas electrode.

4. The process as claimed in claim 1, wherein a mixture of carbon powder and a fluorine resin powder is applied on a sheet substrate and sintered to form a sheet as a gas electrode base.

* * * * *